J. T. DICKEY.
SAW SET.

No. 103,851.　　　　　　　　　　Patented June 7, 1870.

United States Patent Office.

JOHN T. DICKEY, OF FARMINGTON, ILLINOIS.

Letters Patent No. 103,851, dated June 7, 1870.

IMPROVEMENT IN SAW-SET.

The Schedule referred to in these Letters Patent and making part of the same.

*To all whom it may concern:*

Be it known that I, JOHN T. DICKEY, of Farmington, in the State of Illinois, have invented a new and useful Improvement in Saw-Sets; and I do hereby declare that the following is a full, clear, and exact description of the same, reference being had to the accompanying drawing and letters of reference marked thereon making a part of this specification, in which—

Figure 1:
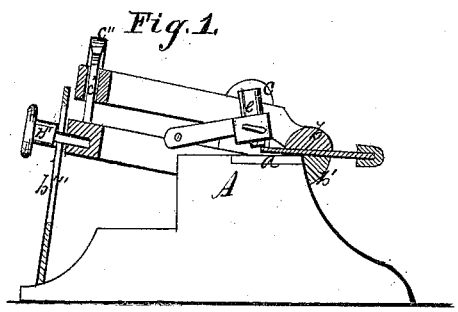
Figure 2:
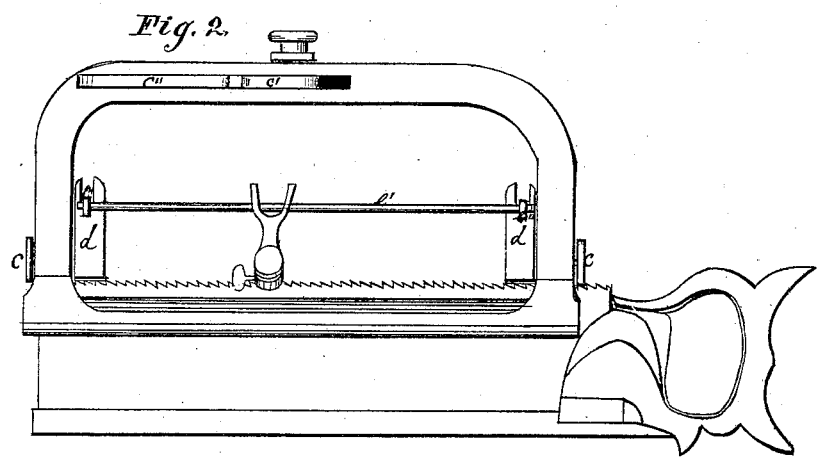
Figure 3:

Figure 1 is an end elevation;
Figure 2 is a plan view; and
Figure 3, a detached view of the set-punch.

This invention consists of a clamp for holding the saw, pivoted in such relation to the anvil upon which the teeth are set that it may hold at a greater or lesser inclination to such table, so as to give them a wider or narrower set at pleasure.

Also, in a set-punch, having an adjustable triangular face, with corners of different degrees of acuteness, to suit saw-teeth of varying degrees of fineness.

To enable those skilled in the art to make and use my invention, I now proceed to describe its construction and operation.

Similar letters in the drawing refer to like parts.

A is the anvil, having a flat upper surface, part of which is formed of a metal plate, $a$, placed along the outer edge of the table, on which plate the saw-teeth are set.

The clamp consists of two jaws, $b\ b'$, the lower one of which is pivoted to the ends of the anvil, and has a set-screw, $b''$, in its back, by means of which, and a vertical slotted plate, $b'''$, stepped in the lower rear part of the anvil, the jaw may be set at any required inclination to the latter.

The upper jaw is pivoted in ears, $c\ c$, rigidly affixed to the lower jaw.

In the bow of the jaw there is a slot, in which is placed an eccentric, $c'$, having a handle, $c''$, by means of which eccentric the two jaws are clamped upon the saw, when it is placed between them.

The amount of saw taken in between the jaws is regulated by adjustable stops, $d\ d$, at the ends of the anvil.

When the saw is in position, the alternate teeth are set, in the usual manner, by striking upon the set-punch $e$, which slides upon a rod, $e'$, held in standards $e''\ e''$ at its ends. The teeth are all set uniformly, as they cannot be driven below the metal plate on the anvil. One-half the teeth having been set, the clamps are unloosed, the saw reversed, and the other half set in the same manner.

The set-punch is formed of a tube, $e$, in which is a triangular metal prism, $h$, retained in the tube by a set-screw, and changeable therein, so as to bring either of its corners in position to strike the teeth. One of the angles of the prism is made quite sharp, so as to set very fine teeth.

What I claim as new, and desire to secure by Letters Patent, is—

1. The clamp $b\ b'$, constructed and arranged with reference to the anvil A, substantially as and for the purpose described.

2. The set-punch, herein described, having the reversible triangular prism, adapted to set fine teeth or coarse, substantially as specified.

J. T. DICKEY

Witnesses:
C. W. HEATON,
J. WING.